United States Patent
Milne et al.

(10) Patent No.: US 7,366,651 B1
(45) Date of Patent: Apr. 29, 2008

(54) CO-SIMULATION INTERFACE

(75) Inventors: Roger B. Milne, Boulder, CO (US);
Jonathan B. Ballagh, Longmont, CO (US); Jeffrey D. Stroomer, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 648 days.

(21) Appl. No.: 10/388,681

(22) Filed: Mar. 14, 2003

(51) Int. Cl.
| | |
|---|---|
| *G06F 9/455* | (2006.01) |
| *G06F 9/44* | (2006.01) |
| *G06F 9/06* | (2006.01) |
| *G06F 9/00* | (2006.01) |
| *G06F 17/50* | (2006.01) |
| *G06F 17/00* | (2006.01) |
| *G01R 31/28* | (2006.01) |
| *G01R 35/00* | (2006.01) |
| *G06F 11/00* | (2006.01) |

(52) U.S. Cl. .......... 703/27; 714/741; 716/4; 703/14

(58) Field of Classification Search .......... 703/27, 703/20, 22, 2, 5, 1, 3
See application file for complete search history.

(56) References Cited

U.S. PATENT DOCUMENTS

| | | | | |
|---|---|---|---|---|
| 5,980,078 | A * | 11/1999 | Krivoshein et al. ............. | 700/1 |
| 6,347,388 | B1 * | 2/2002 | Hollander ................... | 714/739 |
| 6,560,572 | B1 * | 5/2003 | Balaram et al. .............. | 703/22 |
| 6,584,436 | B2 * | 6/2003 | Hellestrand et al. .......... | 703/13 |
| 6,859,913 | B2 * | 2/2005 | Fennell et al. ................. | 716/4 |
| 6,907,584 | B1 | 6/2005 | Milne et al. | |
| 7,110,935 | B1 | 9/2006 | Hwang et al. | |
| 7,143,369 | B1 * | 11/2006 | Milne ............................ | 716/4 |

OTHER PUBLICATIONS

Hoffmann et al., "A Framework for Fast Hardware-Software Co-Simulation", IEEE, 2001, 5 pgs.*
Hlupic et al. "SimSelect: a system for simulation software selection" 1995, ACM, Proceedings of teh 27th conference on Winter simulation, pp. 720-727.*
Tewoldeberhan et al. "An Evaluation and Selection Methodology for Discret-Event Simulation Software" 2002, ACM, Proceedings of the 34th conference on Winter simulation: exploring new frontiers, pp. 67-75.*
Gerin et al., "Scalable and Flexible Cosiumlation of SoC Designs with HEterogeneous Multi-Processor Target Architectures", IEEE, 2001, pp. 63-68.*
U.S. Appl. No. 10/180,857, filed Jun. 25, 2002, Hwang et al.
U.S. Appl. No. 10/389,161, filed Mar. 14, 2003, Milne et al.
U.S. Appl. No. 10/388,936, filed Mar. 14, 2003, Milne.
U.S. Appl. No. 10/389,368, filed Mar. 14, 2003, Ma et al.

* cited by examiner

*Primary Examiner*—Kamini Shah
*Assistant Examiner*—Suzanne Lo
(74) *Attorney, Agent, or Firm*—LeRoy D. Maunu

(57) ABSTRACT

Method and apparatus for interfacing between a high-level modeling system and a hardware description language (HDL) co-simulation engine. A plurality of HDL co-simulation engine libraries are queried as to the capabilities of the engines. A co-simulation engine is selected based on the capabilities, and an instance of the engine is created. The selected co-simulation engine is configured, input logic vectors are provided to the selected HDL co-simulation engine, and the co-simulation engine is executed accordingly.

19 Claims, 5 Drawing Sheets

```
// DLL Query interface:
//   Alternate implementation would have these methods invoked on a
//   cosimulationEngine instance (as returned by newInstance)

// The engineName() method returns the name of the co-simulation engine
EXPORTED string engineName();

// The engineDescriptor() method returns information that describes the
    // co-simulation engine
EXPORTED string engineDescriptor();
        o
        o
        o // The supportsVHDLSource() method indicates whether the co-simulation
    // engine supports VHDL source code
EXPORTED bool supportsVHDLSource();

// The supportsVerilogSource() method indicates whether the co-simulation
    // engine supports Verilog source code
EXPORTED bool supportsVerilogSource();
        o
        o
        o // The supportsBehavioralVHDL() method indicates whether the co-simulation
    // engine supports behavioral VHDL source code
EXPORTED bool supportsBehavioralVHDL();

// The supportsSynthesizableVHDL() method indicates whether the co-
    // simulation engine supports synthesizable VHDL source code
EXPORTED bool supportsSynthesizableVHDL();
        o
        o
        o // The supportsStdLogicInputs() method indicates whether the co-simulation
    // engine supports standard logic vectors
EXPORTED bool supportsStdLogicInputs();
        o
        o
        o // DLL configuration interface
    // The launchDLLConfigurationGUI() method starts the user interface used
    // for configuring the co-simulation engine
EXPORTED int launchDLLConfigurationGUI();

// DLL engine instancing interface:
// Optionally, newInstance could take an unsigned integer argument
//    for engine number (code). This would allow a single DLL to
//    export instances to multiple engine classes, returning non-Null
//    cosimulationEngine pointers for 0code<N, and NULL for codeN.
EXPORTED cosimulationEngine* newInstance();
```

FIG. 4

```
// Note: class "cosimulationEnigne" is pure virtual;
//       only inheriting classes can be instanced, and these classes
//       must define the interface declared in cosimulationEngine EXPORTED class cosimulationEngine
{
    public:
        class generic_cosim_configuration _gen_config;
            // For expediency, the above data member is made public.
            // An API could be provided instead.

vector<unsigned> getSerializedGenericConfig();
        setGenericConfig(vector<unsigned> serialization);
            o
            o
            o // inherited interface:

// configuration interface:

virtual launchClassConfigurationGUI() =0;
        virtual setClassConfig(std::vector<unsigned> serialization) =0;

// query interface:

virtual vector<unsigned> getSerializedClassConfig()const =0;
        virtual int getResourceCount(string resourceName) const;
            o
            o
            o // compilation interface:

virtual int constructSim(class sourceDescriptor) =0;
        virtual int saveSim() const =0;
        virtual int loadSim() =0;
        virtual void destroySim(class sourceDescriptor) =0;

// simulation interface:

virtual void initializeSim() =0;
        virtual void stepSim(class std_logic_vec *inputs,
                             class std_logic_vec *outputs) =0;
            // note: for frame based processing [3], the above
            //       i/o vectors will be multi-dimensional virtual void stopSim() =0;
            // stopSim differs from destroySim in that it leaves any
            // Sim accessories (e.g. waveform viewers) are open
};
```

FIG. 5

CO-SIMULATION INTERFACE

FIELD OF THE INVENTION

The present invention generally relates to co-simulating HDL components in a high-level modeling system.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals as compared to standard logic vectors in a hardware description language (HDL). It is desirable for the high-level abstractions to be precisely correlated with the ultimate implementation representation, both in simulation semantics and in implementation. The Xilinx System Generator tool for DSP and the MathWorks' Simulink and MATLAB environments are example HLMS's in which such capabilities are desirable.

In an HLMS-based design, there may be some components that are described in an HDL. It is often desirable to simulate the HDL components while simulating the HLMS-based design. The process of incorporating an HDL simulation into an HLMS-based simulation is referred to as co-simulation.

A variety of different co-simulation engines are available for use in co-simulating part of a design. The particular co-simulation engine that is selected for use in the simulation depends on design objectives as well as the compatibility between the HLMS and various co-simulation engines.

Example co-simulation engines include both software-based and hardware-based systems. The Modelsim simulator and the NC-SIM simulator from Cadence are example software-based simulators, and the Wildcard simulator from Annapolis Microsystems and the Benone simulator from Nallatech are example hardware-based simulators. In software-based co-simulations the user may perform a behavioral simulation or perform simulation using a synthesized and mapped version of the design.

For large systems it may be desirable to use different co-simulation engines to simulate different parts of the system. However, even with the varied types of co-simulation engines and different high-level modeling systems, the available simulation options may be limited by a lack of infrastructure to support communication between the high-level and low-level simulation components.

A system and method that address the aforementioned problems, as well as other related problems, are therefore desirable.

SUMMARY OF THE INVENTION

The embodiments of the invention provide various methods and apparatus for interfacing between a high-level modeling system and a hardware description language (HDL) co-simulation engine. A plurality of HDL co-simulation engine libraries are queried as to the capabilities of the engines. A co-simulation engine is selected based on the capabilities, and an instance of the engine is created. The selected co-simulation engine is configured, input logic vectors are provided to the selected HDL co-simulation engine, and the co-simulation engine is executed accordingly.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 4 contains example C++ code of exported functions for querying, configuring and instantiating a co-simulation engine; and FIG. 5 contains an example C++ declaration that illustrates how a base class of exported functions is used to define the co-simulation engine interface.

DETAILED DESCRIPTION

The framework that is provided in various embodiments of the invention provides a common interface across multiple types of software-based and hardware-based co-simulation engines. From the perspective of an HLMS, the co-simulation engines operate similarly. Representative functions provided by the interface include querying co-simulation engines for capabilities, instantiating instances of co-simulation engines, and configuring the co-simulation engines with data required for co-simulation and tailored for each engine.

Figure 1:
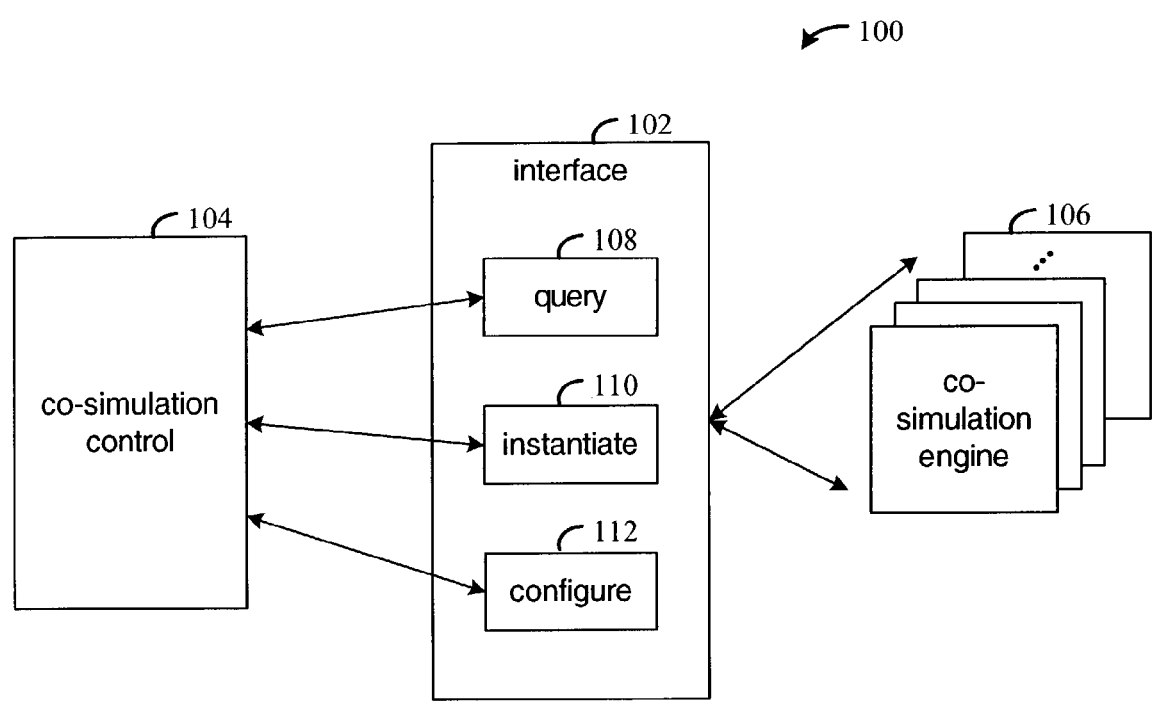
FIG. 1 is a functional block diagram of an arrangement for co-simulation of an electronic circuit design in accordance with various embodiments of the invention.

FIG. 1 is a functional block diagram of an arrangement 100 for co-simulation of an electronic circuit design in accordance with various embodiments of the invention. The elements of interface 102 support interaction between a co-simulation control element 104 and a set of co-simulation engines 106. The co-simulation control element 104 controls the overall simulation. For example, if a design includes both high-level and HDL level components, the co-simulation control may be performed within an HLMS.

The set of co-simulation engines 106 includes multiple co-simulation engines of various types. For example, some of the co-simulation engines are software-based and others are hardware-based. In an example embodiment, the co-simulation control element searches for the available co-simulation engines. For example, if the co-simulation engines are implemented as dynamically linked libraries (DLLs, or a functional equivalent), the co-simulation control element might search particular directories in which the libraries are likely to be stored. For each DLL that is found, the exported application programming interface (API) is examined to determine whether the DLL provides a co-simulation engine. For each of the discovered co-simulation engines, the co-simulation control element uses functions provided by the interface 102 to determine the sets of capabilities of the co-simulation engines and run a simulation in response to user controls.

Example functions provided by interface 102 include a query function 108, an instantiate function 110, and a configure function 112. The query function may be used to determine the capabilities of each of the different co-simulation engines 106. Example capabilities include the ability to co-simulate non-synthesizeable VHDL, the ability to handle input of standard logic vectors (or only bit vectors), which HDLs are supported, whether the simulator is capable of processing frame-based sets of events (and corresponding data) or only single events, and what clocking modes are supported by the co-simulation engine.

The instantiate function 110 is used by the co-simulation control element 104 to create an instance of a co-simulation engine for execution. The instance of the co-simulation engine performs the simulation of the HDL component of the design. It will be appreciated that the co-simulation engines 106 represent the engines that are available for use, and that creating an instance of an engine involves allocating address space for use in executing code and storing data associated with the engine.

The configure function 112 allows the co-simulation control element 104 to customize the configuration data of a selected co-simulation engine. For example, the configuration data may specify for a software-based co-simulation engine software versions, identity of a license server, and the numbers and types of licenses available. For a hardware-based co-simulation engine the data may specify hardware versions and characteristics of the hardware installation. The information may be later used for user diagnostics, as well as to provide user control over partitioning of the design.

Additional functions are described elsewhere in this document, and those skilled in the art will appreciate that interface 102 could be extended to include functions in addition to those described herein.

Those skilled in the art will appreciate that various alternative computing arrangements, including standalone and networked arrangements of various classes of data processing systems, would be suitable for hosting the processes of the different embodiments of the present invention. In addition, the processes may be provided via a variety of computer-readable media or delivery channels such as magnetic or optical disks or tapes, electronic storage devices, or as application services over a network.

Figure 2:
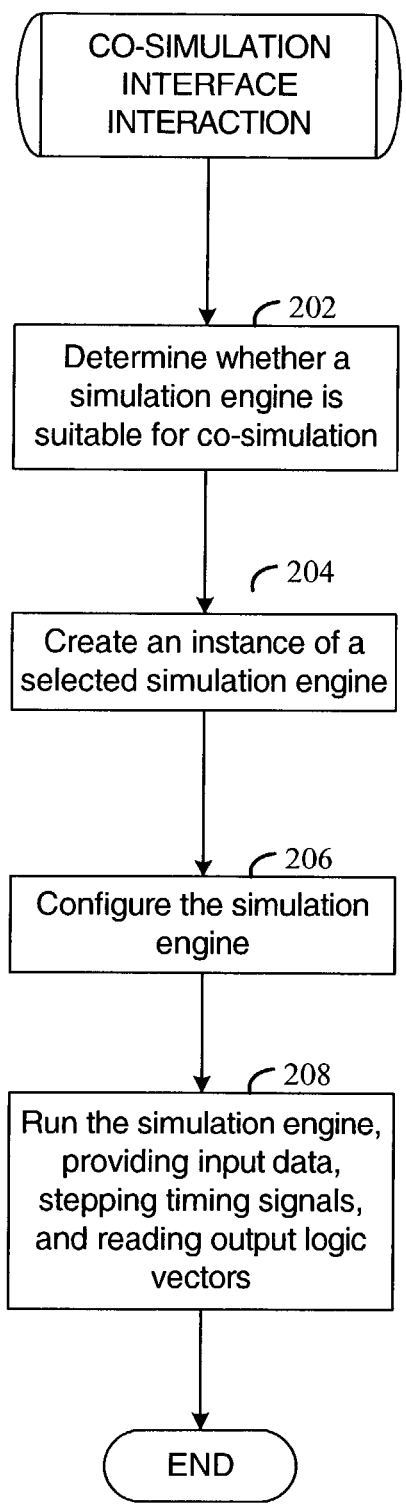
FIG. 2 is a flowchart of an example process that illustrates the interaction between a co-simulation control element and a co-simulation engine via an interface in accordance with various embodiments of the invention.

FIG. 2 is a flowchart of an example process that illustrates the interaction between a co-simulation control element and a co-simulation engine via an interface in accordance with various embodiments of the invention. The query function of the interface provides the ability to determine which co-simulation engines are suitable for a particular use (step 202). For example, in a VHDL block to be simulated, the co-simulation control element may have information that indicates that the block is not synthesizable. In this case, the control element asks each co-simulation engine whether that engine has the ability to co-simulate non-synthesizable VHDL. The control element uses the information from the co-simulation engines in selecting those co-simulation engines that are presented to a user for consideration. Another query might pertain to the ability to handle standard logic vector inputs versus only bit vectors. It will be appreciated that this query could be used either to exclude certain co-simulation engines from use in certain situations and locations, or used by the control element to limit how the co-simulation engines are used. For example, the information could be used to verify at run time that all input standard logic vectors are, in fact, bit vectors.

Queries include both questions that can be presented to any co-simulation engine, as well as engine-specific questions that can be adapted for creating engine-specific plug-ins for an HLMS, for example, engine-specific blocks. Engine-specific questions can be used, for example, to restrict a component of the co-simulation engine to run only on a certain platform such as a hardware platform from a particular vendor. This would be required if, for example, the co-simulation requires external memories hardwired on the board in a particular arrangement. The information returned in response to a query may be presented in the form of strings that represent engine identifiers and associated descriptions. Plug-in programs may be used by the co-simulation control to parse the strings to obtain the desired information.

After the co-simulation control element considers the information returned in response to the queries, a list of co-simulation engines is presented to the user. Once the user selects a co-simulation engine, the control element begins a simulation.

In beginning the simulation, the control element creates an instance of the selected co-simulation engine (step 204). In an example embodiment, the instance is created via a method that the control element expects to find in the co-simulation engine interface.

The static configuration data in a co-simulation engine may can be customized through the configuration interface (step 206). The configuration of the static data can either be initiated from an HLMS or from a separate process, for example, a stand-alone executable designed specifically for performing configuration. Static configuration data include data that are common to a specific type of co-simulation engine and do not vary from one instance to another. For example, in an HDL co-simulation engine that uses the ModelSim simulator, the static configuration data may indicate the available versions of the ModelSim simulator, the license server, and the numbers and types of licenses that are available. For a particular hardware co-simulation engine, the configuration data may indicate the versions of the platform that are available on the system, how the hardware is installed and other characteristics of the hardware platform.

Once the co-simulation has been suitably configured, the co-simulation control element may run the simulation (step 208). In running the co-simulation, the input logic vectors are provided as input to the co-simulation engine when the co-simulation engine is executed. Depending on the capabilities of the co-simulation engine, the events may be processed one at a time or as a set of events in a frame-based system. The application/patent Ser. No. 10/389,161 entitled, "HDL CO-SIMULATION IN A HIGH-LEVEL MODELING SYSTEM", filed concurrent herewith, by Milne et al., and assigned to the assignee of the present invention, describes various techniques for interfacing an HLMS with a HDL co-simulator during simulation and is incorporated herein by reference.

Figure 3:
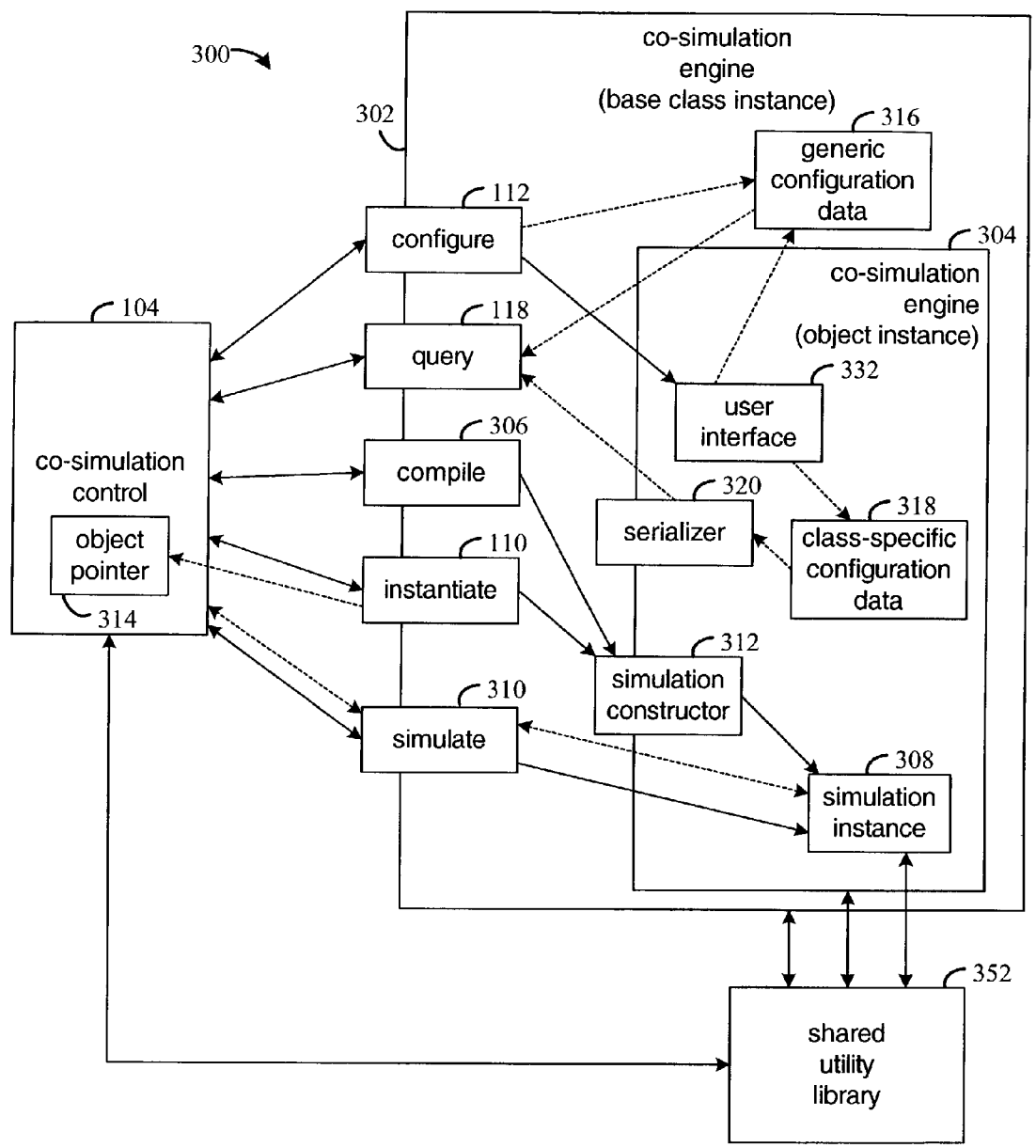
FIG. 3 is a functional block diagram of an arrangement for co-simulation of an electronic circuit design in accordance with various embodiments of the invention.

FIG. 3 is a functional block diagram of an arrangement 300 for co-simulation of an electronic circuit design in accordance with various embodiments of the invention. The base class instance 302 of the co-simulation engine has methods that can be used to access an object instance 304 that is derived from the base class of the co-simulation engine. The object instance extends the base class instance. The solid lines represent the flow of control between components, and the dotted lines represent the flow of data between components.

In this and in other embodiments of the interface, a standard interface is provided by way of the base class. For example, the standard interface includes functions for configuring 112 and querying 108 the co-simulation engine, instructing the co-simulation engine to compile 306 specified HDL, instantiating 110 a simulation instance 308, and simulating 310 a design. Each co-simulation engine extends the base class to implement the functions that provide access to the co-simulation engine by an external co-simulation control element. The functions of the base class are exported by the base class and thereby visible to the external co-simulation control element.

The simulation constructor 312 creates the object instance 304 of the co-simulation engine and contains the code for initializing the co-simulation engine prior to running a simulation. When the simulation constructor is used to instantiate the object instance, an object pointer 314 is returned to the co-simulation control element.

FIG. 4 contains example C++ code 400 of exported functions for querying, configuring and instantiating a co-simulation engine. It will be appreciated that this code is structured for ease of understanding. An alternative implementation might use a single method signature as the exported interface of the co-simulation engine; this method would instance a co-simulation engine. The instancing method would then be lightweight, deferring all heavyweight configuration to subsequent calls. In this embodiment, the engine instances would contain the class-generic query and configuration calls.

As seen in FIG. 4, the newInstance( ) method returns a pointer to a base class object of type cosimulationEngine. FIG. 5 contains an example C++ declaration 500 that illustrates how such a base class can be used to define the co-simulation engine interface. The engineDescriptor( ) method (FIG. 4) returns information that describes characteristics of the associated co-simulation engine.

Returning now to FIG. 3, the co-simulation control element may initialize the co-simulator engine to a known saved state. This is supported via the configure interface 112, which provides access to both the generic configuration data 316 (common to all base class instances) and to class specific configuration data 318. The state of the co-simulator can be saved during a simulation run, and the state can be obtained in generic form from the co-simulator engine via serializer 320. The serializer is shown in FIG. 5 as the method getSerializedClassConfig( ). This method returns a raw un-interpreted binary stream. To restore the co-simulation engine to its previous state, the co-simulation control element passes the stream to the setClassConfig( ) method.

The user interface component allows a user to customize the object instance of the co-simulation engine. For example, in a hardware-based co-simulation engine the user may specify the board address, HDL compilation options, and viewer options (such as for a waveform viewer).

The co-simulation control element may also choose to configure or reconfigure the co-simulation engine by invoking via the launchClassConfigurationGUI( ) method the user interface 332 that is specific to the co-simulation engine. The co-simulation engine controls the operation of its configuration user interface and is free to customize class-specific configuration data 318, the generic configuration data 316, and any static configuration data particular to the co-simulation engine. To customize static configuration data particular to the co-simulation engine, the co-simulation control element can either directly customize the configuration data or invoke the launchDLLConfigurationGUI( ) method.

Having suitably configured the co-simulation engine, the co-simulation control element may commence co-simulation. Before starting a co-simulation, the co-simulation control element may query the co-simulation engine for characteristics that could affect how the co-simulation should be organized. For example, the co-simulation control element may need to organize the design to make best use of resources by unifying several ModelSim-based co-simulations into a single co-simulation to minimize the number of licenses needed. If several co-simulations target a particular type of hardware platform, and several instances of the platform are available, the co-simulation control element might split the co-simulations among the instances. The co-simulation control element can determine which resources are available by calling the getResourceCount( ) method.

Once the co-simulation control element has decided upon the work to be directed to a co-simulation engine, the co-simulation control element calls upon that co-simulation engine to create an instance of a simulation. In the example interface this can be done through the constructSim( ) method, which takes as an argument a shared utility object describing the source to be used to compile the simulation. This object is used as a place to store and organize certain types of data that are commonly passed to co-simulation engines. The object may describe the names and locations of HDL source files, the form of the top level entity, generics, global settings, etc. The object may include both data representing standard information as well as generically stored information that may be specialized for particular co-simulation engines or classes of engines. The constructSim( ) method compiles code in a way that is appropriate for the engine. In a ModelSim-based behavioral costimulation engine, this may simply be to call vcom. In a hardware costimulation engine, compilation may include instrumenting the top level with appropriate support entities (e.g., memory maps) as well as performing additional processing of the design such as synthesizing, mapping, and placing and routing. Some of this work may be assisted by tools in shared utility library 352.

The shared utility library includes elements such as the definition of the co-simulation engine base class, helper classes (standard logic vector, etc.), helper functions for HDL compilation, and utilities for shared objects, for example, memory maps and clock and control generation circuitry for hardware co-simulation platforms. Example HDL compilation helper functions include access methods to a programmatic interface for HDL generation, which allows co-simulation engines to wrap the source code in programmatically defined netlists that contain components such as memory maps and clock-pulse generators.

A co-simulation engine may save for later use the compilation results for a simulation. For example, a hardware-based co-simulation engine would save a configuration bitstream. The co-simulation control element could later instruct a co-simulation engine to initialize using the saved results. By eliminating compilation time, a co-simulation may be done with minimal set-up time. The example saveSim( ) and loadSim( ) methods of the cosimulationEngine class (FIG. 5) support these capabilities.

To initialize the simulation the co-simulation control element calls the initializeSim( ) method. This allows the co-simulation engine to perform class specific actions to prepare for simulation. For example, calling the method in a ModelSim-based co-simulator could invoke ModelSim setup scripts. For a hardware platform co-simulation engine, calling the method could initialize the device by loading the bitstream.

The present invention is believed to be applicable to a variety of arrangements for co-simulating electronic circuit designs and has been found to be particularly applicable and beneficial in arrangements with different types of co-simulation engines. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-based method of interfacing between a high-level modeling system and a hardware description language (HDL) co-simulation engine, comprising:
   querying a plurality of HDL co-simulation engines for capabilities of the engines;
   wherein the querying includes submitting respective queries from a processor-executable control element to the plurality of co-simulation engines, and each co-simulation engine includes a query interface that is responsive to queries from the control element;
   receiving from the plurality of co-simulation engines by the control element, information that specifies respective capabilities of the co-simulation engines;
   displaying a list that identifies each co-simulation engine having one or more of the capabilities;
   selecting an HDL co-simulation engine based on the capabilities;
   wherein the selecting of an HDL co-simulation engine is in response to user input;
   creating an instance of the selected co-simulation engine configuring the selected co-simulation engine; and
   providing input logic vectors to the selected HDL co-simulation engine, executing the selected HDL co-simulation engine, and retrieving output logic vectors from the selected HDL co-simulation engine.

2. The method of claim 1, further comprising:
   instructing the selected co-simulation engine to compile specified HDL code; and
   compiling the specified HDL code.

3. The method of claim 2, wherein compiled code is generated from compilation of the specified HDL code, the method further comprising:
   instructing the selected co-simulation engine to save the compiled code.

4. The method of claim 3, further comprising instructing the selected co-simulation engine to simulate using previously saved compiled code.

5. The method of claim 1, further comprising determining from the information returned from the plurality of co-simulation engines whether a co-simulation engine simulates non-synthesizable VHDL.

6. The method of claim 1, further comprising determining from the information returned from the plurality of co-simulation engines whether a co-simulation engine handles standard logic vectors.

7. The method of claim 1, further comprising determining from the information returned from the plurality of co-simulation engines whether a co-simulation engine handles only bit vectors.

8. The method of claim 1, wherein configuring a co-simulation engine comprises specifying configuration parameters for a software-based co-simulation engine.

9. The method of claim 1, wherein configuring a co-simulation engine comprises specifying configuration parameters for a hardware-based co-simulation engine.

10. An article of manufacture, comprising:
    a computer-readable medium configured with instructions that when executed by a computer, cause the computer to provide communication between a high-level modeling system and a hardware description language (HDL) simulator by performing steps including,
    querying capabilities of a co-simulation engine responsive to a call to a first program-callable function and returning information that specifies capabilities of the co-simulation engine to a caller of the first function;
    wherein the co-simulation engine includes a query interface that is responsive to a query from the first program-callable function;
    establishing configuration data in the co-simulation engine responsive to a call to a second program-callable function; and
    providing input logic vectors to the co-simulation engine, stepping the co-simulation engine, and retrieving output logic vectors from the co-simulation engine responsive to a call to a third program-callable function.

11. The article of manufacture of claim 10, wherein the computer-readable medium is configured with further instructions for compiling specified HDL code in response to a fourth program-callable function.

12. The article of manufacture of claim 11, wherein compiled code is generated from compilation of the specified HDL code, and the fourth function is further configured to selectively save the compiled code in response to an input parameter to the fourth function.

13. The article of manufacture of claim 12, wherein the computer-readable medium is configured with further instructions for simulating previously saved compiled code in response to a fifth program-callable function.

14. The article of manufacture of claim 10, wherein the first function is further configured to obtain information that indicates whether a co-simulation engine simulates non-synthesizable VHDL.

15. The article of manufacture of claim 10, wherein the first function is further configured to obtain information that indicates whether a co-simulation engine handles standard logic vectors.

16. The article of manufacture of claim 10, wherein the first function is further configured to obtain information that indicates whether a co-simulation engine handles only bit vectors.

17. The article of manufacture of claim 10, wherein the second function is further configured to establish configuration parameters for a software-based co-simulation engine.

18. The article of manufacture of claim 17, wherein the second function is further configured to establish configuration parameters for a hardware-based co-simulation engine.

19. An apparatus for interfacing between a high-level modeling system and a hardware description language (HDL) co-simulation engine, comprising:
    means for querying a plurality of HDL co-simulation engines for capabilities of the engines;
    wherein the means for querying includes means for submitting respective queries from a processor-executable control element to the plurality of co-simulation engines, and each co-simulation engine includes a query interface that is responsive to queries from the control element;
    means for receiving from the plurality of co-simulation engines by the control element, information that specifies respective capabilities of the co-simulation engines;
    means for displaying a list that identifies each co-simulation engine having one or more of the capabilities;

means for selecting an HDL co-simulation engine based on the capabilities;
wherein the selecting of an HDL co-simulation engine is in response to user input;
means for creating an instance of the selected co-simulation engine means for configuring the selected co-simulation engine; and
means for providing input logic vectors to the selected HDL co-simulation engine, executing the selected HDL co-simulation engine, and retrieving output logic vectors from the selected HDL co-simulation engine.

* * * * *